(12) United States Patent
You et al.

(10) Patent No.: US 11,501,739 B2
(45) Date of Patent: Nov. 15, 2022

(54) OPERATION METHOD AND OPERATION SYSTEM FOR VIRTUALLY PARTITIONING A DISPLAY PANEL ACCORDING TO QUANTITY DATA OF TRANSMITTERS

(71) Applicants: BenQ Intelligent Technology (Shanghai) Co., Ltd, Shanghai (CN); BENQ CORPORATION, Taipei (TW)

(72) Inventors: Lin-Yuan You, Taipei (TW); Jung-Kun Tseng, Taipei (TW); Chia-Nan Shih, Taipei (TW); Chen-Chi Wu, Taipei (TW); Chin-Fu Chiang, Taipei (TW); Chuang-Wei Wu, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 17/373,798

(22) Filed: Jul. 13, 2021

(65) Prior Publication Data
US 2022/0013085 A1 Jan. 13, 2022

(30) Foreign Application Priority Data
Jul. 13, 2020 (CN) .......................... 202010669203.5

(51) Int. Cl.
*G09G 5/14* (2006.01)
*G09G 5/00* (2006.01)

(52) U.S. Cl.
CPC .............. *G09G 5/14* (2013.01); *G09G 5/005* (2013.01); *G09G 2300/02* (2013.01);
(Continued)

(58) Field of Classification Search
CPC ...... G09G 5/14; G09G 5/005; G09G 2300/02; G09G 2300/023; G09G 2300/026;
(Continued)

(56) References Cited

U.S. PATENT DOCUMENTS 10,264,213 B1 * 4/2019 Sculley ................ H04L 65/403
2003/0117532 A1 6/2003 Karasawa
(Continued)

FOREIGN PATENT DOCUMENTS

CN 1430409 A 7/2003
CN 1476242 A 2/2004
(Continued)

*Primary Examiner* — Brent D Castiaux
(74) *Attorney, Agent, or Firm* — Winston Hsu (57) ABSTRACT

An operation method for virtually partitioning a display panel includes establishing a plurality of first links between a plurality of transmitter and a receiver, establishing a second link between the receiver and a central controller, acquiring quantity data of the plurality of transmitter by the central controller, generating an operational interface by virtually partitioning the display panel by the central controller according to the quantity data, and controlling the receiver for operating a transmitter to executing at least one operational function by the central controller through the second link and a first link or directly controlling the transmitter to executing the at least one operational function by the central controller through a third link when a virtual key corresponding to the transmitter displayed on the operational interface generated by the central controller is triggered.

21 Claims, 4 Drawing Sheets

(52) U.S. Cl.
CPC . *G09G 2300/023* (2013.01); *G09G 2300/026* (2013.01); *G09G 2320/08* (2013.01); *G09G 2320/10* (2013.01); *G09G 2354/00* (2013.01); *G09G 2370/16* (2013.01); *G09G 2370/20* (2013.01)

(58) Field of Classification Search
CPC ........... G09G 2320/08; G09G 2320/10; G09G 2354/00; G09G 2370/16; G09G 2370/20; G09G 2350/00; G09G 2370/022; H04N 7/147; H04N 7/15; H04N 7/155; H04N 5/23203; H04N 5/2624
See application file for complete search history.

(56) References Cited

U.S. PATENT DOCUMENTS

| | | |
|---|---|---|
| 2004/0130568 A1 | 7/2004 | Nagano |
| 2010/0214481 A1* | 8/2010 | Karaoguz .......... H04N 21/4402 348/E5.133 |
| 2018/0011679 A1* | 1/2018 | Sugioka ................ G09G 5/006 |
| 2018/0061288 A1* | 3/2018 | Kubota ................ G09G 3/001 |

FOREIGN PATENT DOCUMENTS

| | | |
|---|---|---|
| CN | 104539872 A | 4/2015 |
| TW | 201539312 A | 10/2015 |
| TW | 201911858 A | 3/2019 |

\* cited by examiner

OPERATION METHOD AND OPERATION SYSTEM FOR VIRTUALLY PARTITIONING A DISPLAY PANEL ACCORDING TO QUANTITY DATA OF TRANSMITTERS

BACKGROUND OF THE INVENTION

1. Field of the Invention

The present invention illustrates an operation method and an operation system for virtually partitioning a display Panel, and more particularly, an operation method and an operation system for virtually partitioning the display Panel according to quantity data of transmitters.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify several hardware components such as a hard disk, a universal serial bus (USB), and a compact disc—read only memory (CD-ROM) device. Then, data saved in previously mentioned physical or virtual storage devices can be transmitted to a screen or display device through a wireless network. Ina second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency.

Further, for a moderator, it is a very important issue to control the timing of presenting report contents of the meeting members in real-time. The moderator has to switch images of the report contents of different meeting members in real-time. If the moderator smoothly controls a meeting process, the discussion efficiency of the meeting can be improved. However, a current controller lacks producing an operational interface with a dynamic keyboard. The operational interface of the controller is predetermined and fixed. Therefore, when the browsing authority of meeting data is changed or the number of meeting members is changed, it is difficult for the current controller to dynamically set operation details.

SUMMARY OF THE INVENTION

In an embodiment of the present invention, an operation method for virtually partitioning a display panel is disclosed. The operation method comprises establishing a plurality of first links between a plurality of transmitters and a receiver, establishing a second link between the receiver and a central controller, acquiring quantity data of the plurality of transmitters by the central controller, generating an operational interface by virtually partitioning the display panel by the central controller according to the quantity data, transmitting an image signal from an image data source coupled to a transmitter of the plurality of transmitters to the transmitter after the transmitter is triggered, processing the image signal by the transmitter and transmitting the image signal to the receiver through a corresponding first link of the plurality of first links by the transmitter, and controlling the receiver for operating the transmitter to execute at least one operational function by the central controller through the second link and the first link or directly controlling the transmitter to execute the at least one operational function by the central controller through a third link when a virtual key corresponding to the transmitter displayed on the operational interface generated by the central controller is triggered.

In another embodiment of the present invention, an operation system for virtually partitioning a display panel is disclosed. The operation system comprises a plurality of transmitters, a receiver, a display device, and a central controller. The plurality of transmitters are configured to transmit data. The receiver is linked to the plurality of transmitters. The display device is coupled to the receiver and configured to display images. The central controller is linked to the receiver and configured to control the receiver. The display panel is disposed on the central controller. A plurality of first links between the plurality of transmitters and the receiver are established. A second link between the receiver and the central controller is established. The central controller acquires quantity data of the plurality of transmitters. The central controller generates an operational interface by virtually partitioning the display panel according to the quantity data. An image data source coupled to a transmitter of the plurality of transmitters transmits an image signal to the transmitter after the transmitter is triggered. The transmitter processes the image signal and transmits the image signal to the receiver through a corresponding first link of the plurality of first links. The central controller controls the receiver for operating the transmitter to execute at least one operational function through the second link and the first link or directly controls the transmitter to execute the at least one operational function through a third link when a virtual key corresponding to the transmitter displayed on the operational interface generated by the central controller is triggered.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
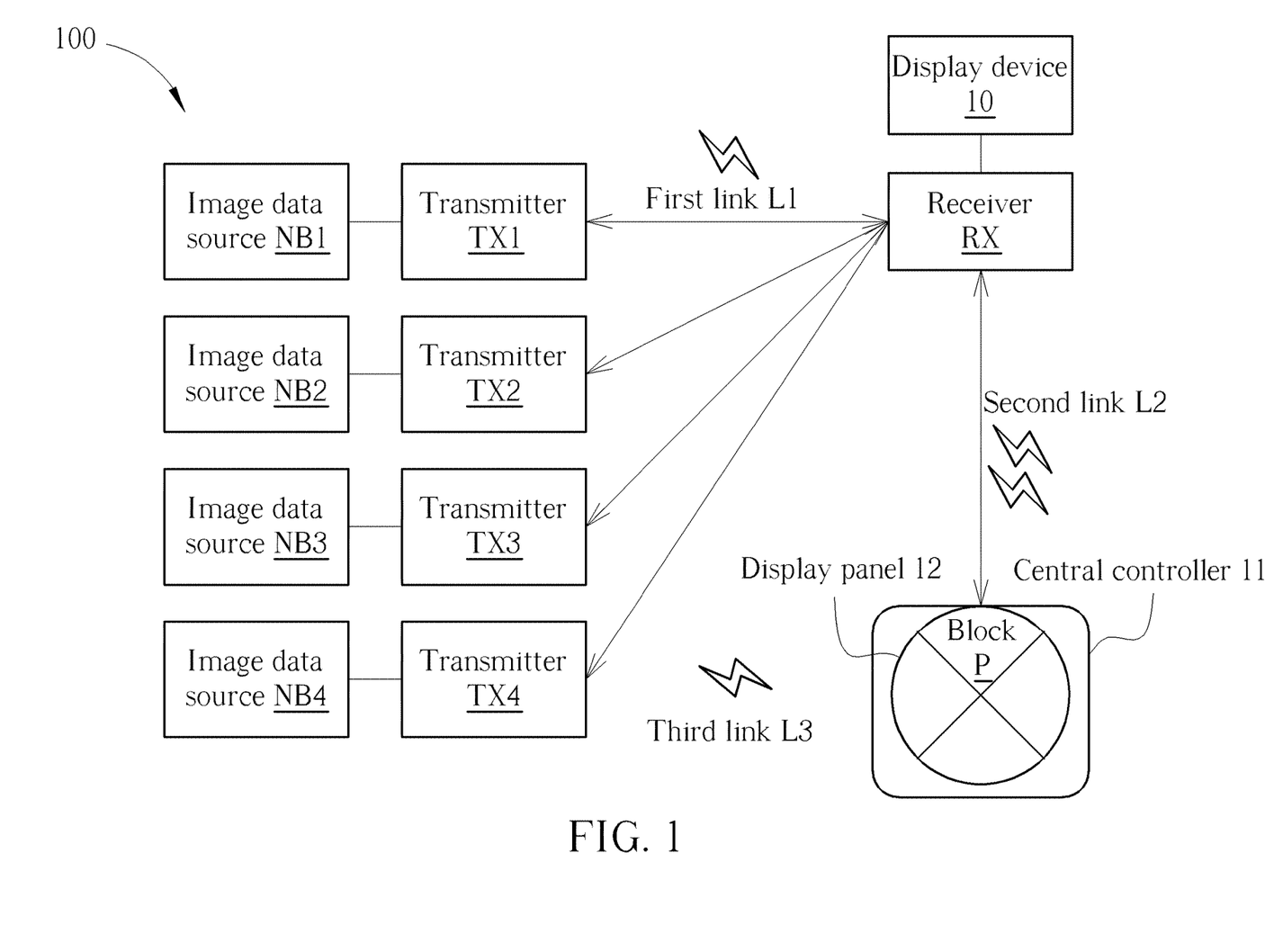
FIG. 1 is a block diagram of an operation system for virtually partitioning a display panel according to an embodiment of the present invention.

FIG. 1 is a block diagram of an operation system for virtually partitioning a display panel according to an embodiment of the present invention. For simplicity, the operation system for virtually partitioning a display panel is illustrated as an operation system 100 hereafter. The operation system 100 includes a plurality of transmitters TX1 to TX4, a receiver RX, and a central controller 11. The transmitters TX1 to TX4 are used for transmitting data. The receiver RX is linked to the transmitters TX1 to TX4. The receiver RX can be linked to the transmitters TX1 to TX4 by using any wireless communications protocol. The display device 10 is coupled to the receiver RX for displaying images. The central controller 11 has a display panel 12. The central controller 11 is linked to the receiver RX for controlling the receiver RX.

In FIG. 1, the transmitters TX1 to TX4 can be hardware plug-in components, such as USB-Type A (Type-A universal serial bus) devices, HDMI (High Definition Multimedia Interface) devices and/or USB-Type C (Type-C USB) devices capable of establishing communication links. The transmitters TX1 to TX4 can be coupled to corresponding image data sources. For example, the transmitter TX1 is coupled to the image data source NB1. The transmitter TX2 is coupled to the image data source NB2. The transmitter TX3 is coupled to the image data source NB3. The transmitter TX4 is coupled to the image data source NB4. The image data sources NB1 to NB4 can be any image devices, such as desktop computers, media players, smart phones, or notebooks. Further, the present invention is not limited by the transmitters TX1 to TX4 and the image data sources NB1 to NB4. In other embodiments, the number of transmitters and image data sources can be any positive integer. The first link L1, the second link L2, and the third link L3 can be wired or wireless links. In the operation system 100, a plurality of first links L1 are established between the transmitters TX1 to TX4 and the receiver RX. A second link L2 is established between the receiver RX and the central controller 11. The central controller 11 can acquire quantity data of the transmitters TX1 to TX4. The quantity data can include a user-defined value, the number of transmitter links, or the number of members authorized for sharing meeting data. Then, according to the quantity data, the central controller 11 can virtually partition the display panel 12 for generating an operational interface. Further, after a transmitter of the transmitters TX1 to TX4 (i.e., such as the transmitter TX1) is triggered, the image data source NB1 coupled to the transmitter TX1 can transmit an image signal to the transmitter TX1. The transmitter TX1 can process the image signal and then transmit the image signal to the receiver RX through the first link L1. As shown in FIG. 1, the display panel 12 of the central controller 11 can be virtually partitioned into a plurality of blocks P according to the quantity data for generating the operational interface. Each of the plurality of blocks P can include at least one virtual button. If the virtual button (i.e., such as a virtual button displayed on a block P) of the corresponding transmitter (i.e., such as the transmitter TX1) is triggered through the operational interface generated by the central controller 11, the central controller 11 can control the receiver RX for executing at least one operational function of the transmitter TX1 through the second link L2 and the first link L1. Further, if the virtual button corresponding to the transmitter TX1 is triggered, the central controller 11 can directly control the transmitter TX1 through a third link L3 for performing the at least one operational function. Here, the at least one operational function can be any default or user-defined function, such as a signal blocking function, a browsing restriction function, a permission configuring function, or a data sharing function. Details of the operation method for virtually partitioning the display panel 12 performed by the operation system 100 according to the quantity data are illustrated later.

In the operation system 100, some or all of the transmitters TX1 to TX4 can request to establish links with the receiver RX. Then, the receiver RX can establish at least one first link L1 with at least one of the transmitters TX1 to TX4. Then, after some transmitters are triggered, these transmitters can transmit the image signal to the receiver RX and then enter a standby state. The central controller 11 is coupled to the receiver RX for acquiring the identification data of the at least one of the transmitters TX1 to TX4 by using various modes, as described below. For example, in a first mode, the receiver RX can transmit a request signal to the transmitters TX1 to TX4. After the transmitters TX1 to TX4 receive the request signal, they can transmit the identification data to the receiver RX through the first links L1. The receiver RX can transmit the identification data to the central controller 11 through the second link L2. In a second mode, the receiver RX establishes the first links L1 with the transmitters TX1 to TX4. Then, the transmitters TX1 to TX4 can automatically transmit identification data to the receiver RX. The receiver RX can transmit the identification data to the central controller 11 through the second link L2. In a third mode, the third links L3 are established between the central controller 11 and the transmitters TX1 to TX4. The plurality of third links L3 can be wireless links, such as Wi-Fi links. The central controller 11 can directly transmit the request signal to the transmitters TX1 to TX4. After the request signal is received by the transmitters TX1 to TX4, the transmitters TX1 to TX4 can transmit the identification data to the central controller 11 through the third links L3. In a fourth mode, after the central controller 11 establishes the third links L3 with the transmitters TX1 to TX4, the transmitters TX1 to TX4 can automatically transmit the identification data to the central controller 11. In the four modes previously mentioned, the central controller 11 or the receiver RX can acquire the identification data of the transmitters TX1 to TX4. Therefore, the central controller 11 can map the transmitters TX1 to TX4 to corresponding P blocks displayed on the operational interface. However, technologies of transmitting identification data of the present invention are not limited by the four modes previously mentioned.

Here, the "identification data" can be any data used for distinguishing different transmitters. A format of the identification data can be an identification packet or an identification code. After the central controller 11 or the receiver RX receives the identification data, the number of currently linked transmitters can be counted. For example, as shown in FIG. 1, the number of transmitters is 4. However, the number of transmitters can also be customized by the receiver RX. Further, after the central controller 11 receives the quantity data of the transmitters, the central controller 11 can partition the operational interface into P blocks according to the quantity data of the transmitters. Then, the quantity data and identification data of the transmitters can be saved in the central controller 11. Further, after the central controller 11 or the receiver RX receives the identification data, it can transmit a control signal for controlling identification features of the transmitters TX1 to TX4. The identification features of the transmitters TX1 to TX4 are synchronized with display features of the P blocks on the operational interface of the central controller 11, as illustrated below.

Figure 2A:
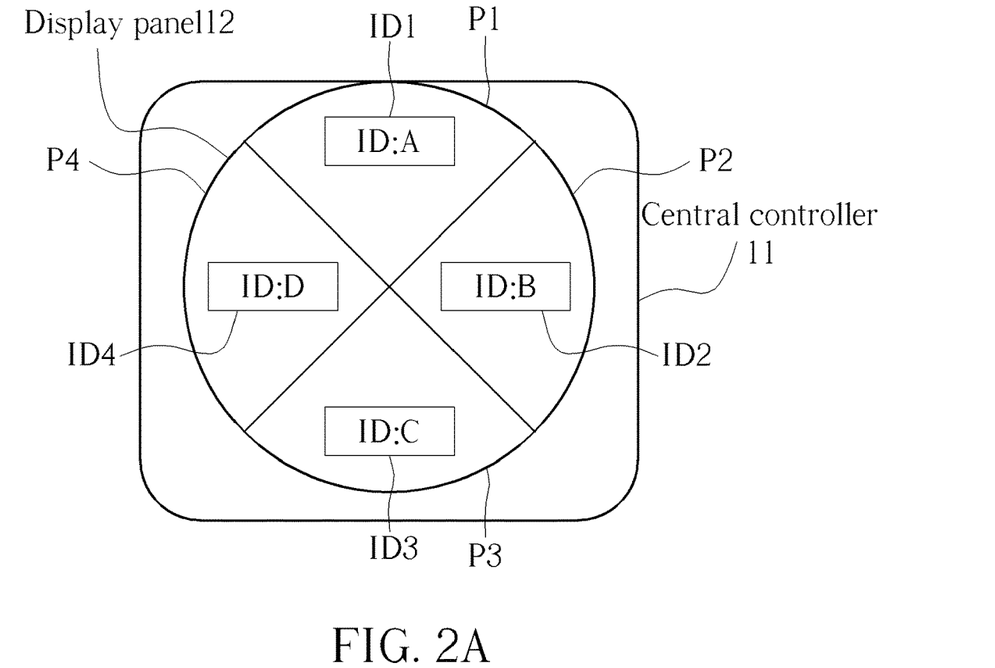
FIG. 2A is an illustration of a first operating mode of a central controller of the operation system in FIG. 1.
Figure 2B:
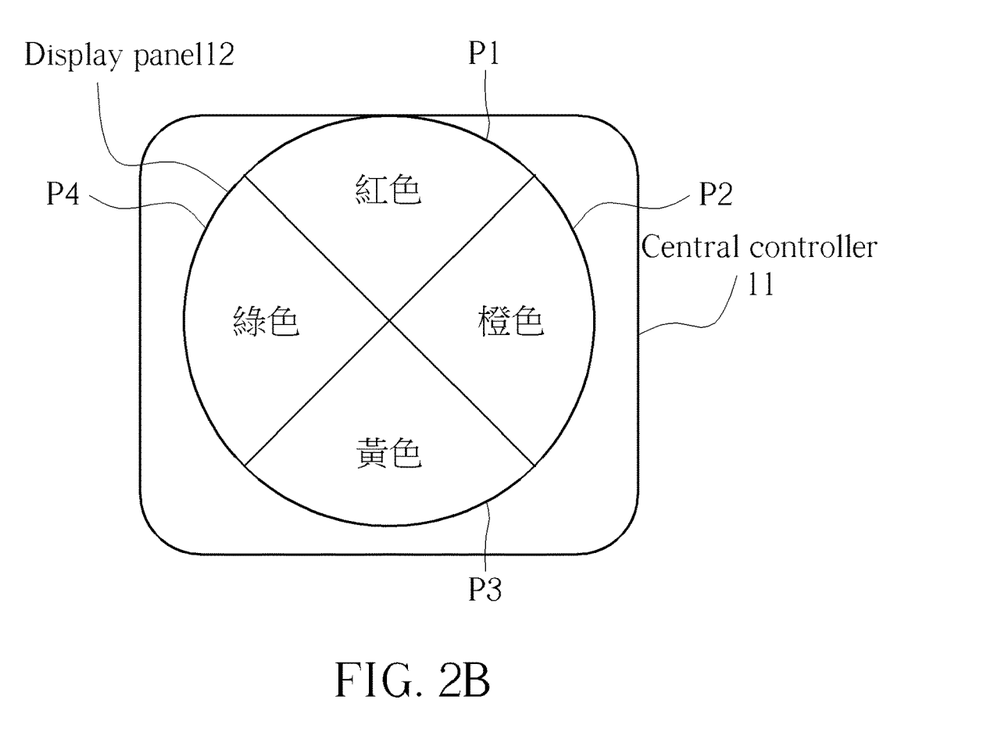
FIG. 2B is an illustration of a second operating mode of the central controller of the operation system in FIG. 1.
Figure 2C:
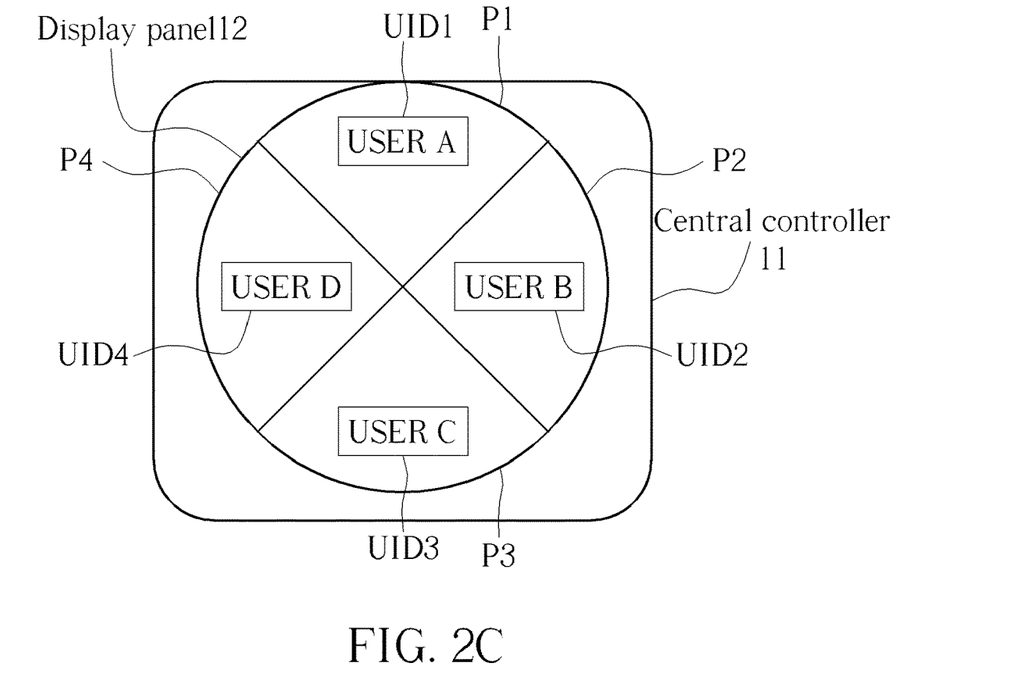
FIG. 2C is an illustration of a third operating mode of the central controller of the operation system in FIG. 1.
Figure 2D:
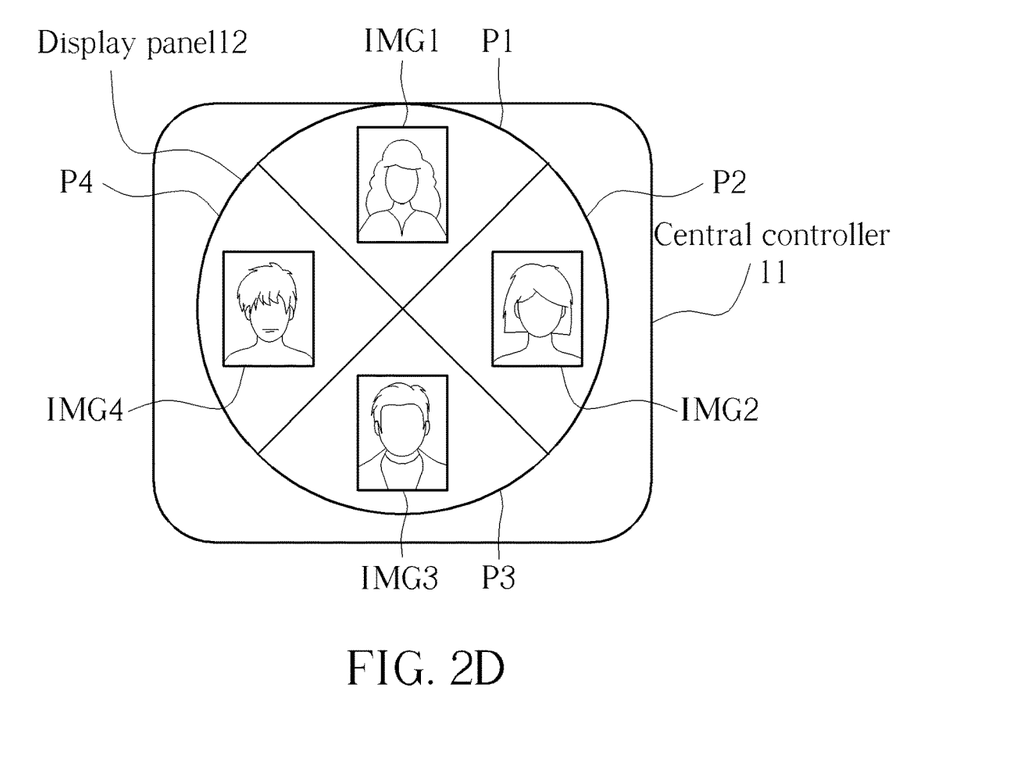
FIG. 2D is an illustration of a fourth operating mode of the central controller of the operation system in FIG. 1.

FIG. 2A is an illustration of a first operating mode of the central controller 11 of the operation system 100. FIG. 2B is an illustration of a second operating mode of the central controller 11 of the operation system 100. FIG. 2C is an illustration of a third operating mode of the central controller 11 of the operation system 100. FIG. 2D is an illustration of a fourth operating mode of the central controller 11 of the operation system 100. In FIG. 2A, the receiver RX or the central controller 11 can transmit an identification code to at least one transmitter. The identification codes received by the transmitters can be synchronized with identification codes displayed on the blocks P1 to P4 displayed on the display panel 12 of the central controller 11. For example, after the transmitter TX1 receives an identification code "ID:A", the block P1 displayed on the display panel 12 of the central controller 11 can display a text image ID1 of the identification code "ID:A". After the transmitter TX2 receives an identification code "ID:B", the block P2 displayed on the display panel 12 of the central controller 11 can display a text image ID2 of the identification code "ID:B". After the transmitter TX3 receives an identification code "ID:C", the block P3 displayed on the display panel 12 of the central controller 11 can display a text image ID3 of the identification code "ID:C". After the transmitter TX4 receives an identification code "ID:D", the block P4 displayed on the display panel 12 of the central controller 11 can display a text image ID4 of the identification code "ID:D". Since the blocks P1 to P4 displayed on the display panel 12 of the central controller 11 include the text images ID1 to ID4 corresponding to the identification codes of the transmitters TX1 to TX4, a user can intuitively operate at least one transmitter through the operational interface displayed on the display panel 12 of the central controller 11.

In FIG. 2B, the receiver RX or the central controller 11 can transmit a plurality of indication signals to the at least one transmitter. Therefore, the at least one transmitter can display a designated color. For example, after the transmitter TX1 receives the indication signal, a light-emitting device (such as an LED) of the transmitter TX1 can emit red light. The block P1 on the display panel 12 of the central controller 11 can display red color. After the transmitter TX2 receives the indication signal, the LED of the transmitter TX2 can emit orange light. The block P2 on the display panel 12 of the central controller 11 can be displayed in orange color. After the transmitter TX3 receives the indication signal, the LED of the transmitter TX3 can emit yellow light. The block P3 on the display panel 12 of the central controller 11 can display yellow color. After the transmitter TX4 receives the indication signal, the LED of the transmitter TX4 can emit green light. The block P4 on the display panel 12 of the central controller 11 can display green color. In other words, the operational interface generated by the central controller 11 includes blocks P1 to P4 for virtually partitioning the display panel 12. The blocks P1 to P4 corresponding to different colors can be displayed by different transmitters TX1 to TX4. Therefore, the central controller 11 can easily operate at least one transmitter through the operational interface displayed on the display panel 12.

In FIG. 2C, after the transmitters TX1 to TX4 are respectively coupled to the image signal sources NB1 to NB4, the transmitters TX1 to TX can acquire text recognition information corresponding to the image signal sources NB1 to NB4. The central controller 11 can further acquire the text recognition information of the image signal sources NB1 to NB4. Then, the central controller 11 can display the text recognition information of the image signal sources NB1 to NB4 on the blocks P1 to P4 of the display panel 12, respectively. For example, the transmitter TX1 can acquire computer user name information, denoted as USER A. The central controller 11 can acquire the user name information "USER A" through a wireless link. Then, the block P1 on the display panel 12 of the central controller 11 can be used for displaying a text image UID1 of the user name information "USER A". The transmitter TX2 can acquire computer user name information, denoted as USER B. The central controller 11 can acquire the user name information "USER B" through a wireless link. Then, the block P2 on the display panel 12 of the central controller 11 can be used for displaying a text image UID2 of the user name information "USER B". The transmitter TX3 can acquire computer user name information, denoted as USER B. The central controller 11 can acquire the user name information "USER C" through a wireless link. Then, the block P3 on the display panel 12 of the central controller 11 can be used for displaying a text image UID3 of the user name information "USER C". The transmitter TX4 can acquire computer user name information, denoted as USER D. The central controller 11 can acquire the user name information "USER D" through a wireless link. Then, the block P4 on the display panel 12 of the central controller 11 can be used for displaying a text image UID4 of the user name information "USER D". Since the blocks P1 to P4 of the central controller 11 carry the text recognition information, the central controller 11 can easily operate at least one transmitter through the operational interface displayed on the display panel 12.

In FIG. 2D, after the transmitters TX1 to TX4 are respectively coupled to the image signal sources NB1 to NB4, the transmitters TX1 to TX can be used for triggering corresponding cameras to capture image identification information of users (i.e., personal photos). The central controller 11 can acquire the identification information of users through wireless links. Then, the central controller 11 can display the identification information of users on the blocks P1 to P4 of the display panel 12. For example, the transmitter TX1 can be used for triggering the corresponding camera to capture the photo IMG1 of the user A. The central controller 11 can acquire a head photo IMG1 of the user A through a wireless link. Then, the block P1 on the display panel 12 of the central controller 11 can be used for displaying the head photo IMG1 of the user A. The transmitter TX2 can be used for triggering the corresponding camera to capture the photo IMG2 of the user B. The central controller 11 can acquire a head photo IMG2 of the user B through a wireless link. Then, the block P2 on the display panel 12 of the central controller 11 can be used for displaying the head photo IMG2 of the user B. The transmitter TX3 can be used for triggering the corresponding camera to capture the photo IMG3 of the user C. The central controller 11 can acquire a head photo IMG3 of the user C through a wireless link. Then, the block P3 on the display panel 12 of the central controller 11 can be used for displaying the head photo IMG3 of the user C. The transmitter TX4 can be used for triggering the corresponding camera to capture the photo IMG4 of the user D. The central controller 11 can acquire a head photo IMG4 of the user D through a wireless link. Then, the block P4 on the display panel 12 of the central controller 11 can be used for displaying the head photo IMG4 of the user D. Since the blocks P1 to P4 of the central controller 11 carry the image recognition information of the users, the central controller 11 can easily operate at least one transmitter through the operational interface displayed on the display panel 12.

As previously mentioned, the central controller 11 can virtually partition the display panel 12 into the plurality of blocks P according to the quantity data for generating the operational interface. The central controller 11 can generate a control signal to control at least one transmitter for performing at least one operational function through the operational interface. For example, after the block P1 of the operational interface is triggered, the central controller 11 can generate the control signal to the receiver RX through the second link L2. Then, the receiver RX can control the transmitter TX1 through the first link L1 according to the control signal for blocking the transmitter TX1. For example, after the block P1 of the operational interface is triggered, the central controller 11 can generate the control signal. Then, the central controller 11 can directly transmit the control signal to the transmitter TX1 through the third link L3. After the transmitter TX1 receives the control signal, the transmitter TX1 is blocked. The previously mentioned communication method can be performed by using the following data path: (1) central controller 11→receiver RX→transmitter TX1; (2) central controller 11→transmitter TX1. However, the central controller 11 may only communicate with the receiver RX. The receiver RX can block the data. For example, the central controller 11 can generate the control signal. The control signal can be transmitted to the receiver RX through the second link L2. The receiver RX blocks the data transmitted from the at least one transmitter according to the control signal. In other words, after the image signal of the transmitter TX1 is transmitted to the receiver RX, if the transmitter TX1 is operated under a block state, the receiver RX can directly block the image signal transmitted from the transmitter TX1. The display panel 12 can also be a touch panel. The central controller can feed back a touch command to the receiver RX. The receiver RX can select a part of available transmitters for outputting/blocking the image signal according to the touch command. Further, the previously mentioned "blocking" operation is only a function operation of the embodiment of the transmitter TX1. The operation mode of the transmitter TX1 can be any reasonable operation mode. For example, the central controller 11 or the receiver RX can control a screen output mode, a browsing authority mode, a sharing authority mode, or a data accessing authority mode of the at least one transmitter. In other words, for the operational interface displayed on the display panel 12 of the central controller 11, when a certain block is triggered, the operational interface can display detailed configurations. Any reasonable technology modification falls into the scope of the present invention.

Further, as previously mentioned, since the transmitters TX1 to TX4 can communicate with the receiver RX through wireless links (i.e., the first links L1), the transmitters TX1 to TX4 may also be disconnected unexpectedly. Further, a new transmitter can also be added to establish a first link L1 with the receiver RX. In other words, the number of transmitters linked to the receiver RX may be changed over time. Therefore, in the operation system 100, the receiver RX or the central controller 11 can continuously scan (or say, detect) if there is a disconnected or a newly added transmitter. If the number of transmitters currently available is not changed during a time interval, the receiver RX or the central controller can continuously detect link statuses. If the number of transmitters currently available is changed during the time interval, the receiver RX can transmit updated quantity data of the transmitters and identification codes to the central controller 11 for recalculating the number of available links. As previously mentioned, the transmitters currently linked to the receiver can automatically transmit the identification codes to the central controller 11. The central controller 11 can also recalculate the number of available links accordingly. Similarly, the operational interface of the central controller 11 can also be updated according to the recalculated number of available links. For example, the central controller 11 can partition the display panel 12 into N blocks according to the number N of available links at a first time. When a certain transmission device is disconnected at a second time, the central controller 11 can partition the display panel 12 into (N−1) blocks at the second time according to the recalculated number (N−1) of available links. Further, when two new transmitters are added at a third time, the central controller 11 can partition the display panel 12 into (N+1) blocks according to the recalculated number (N+1) of available links at the third time. N is a positive integer greater than two.

Figure 3:
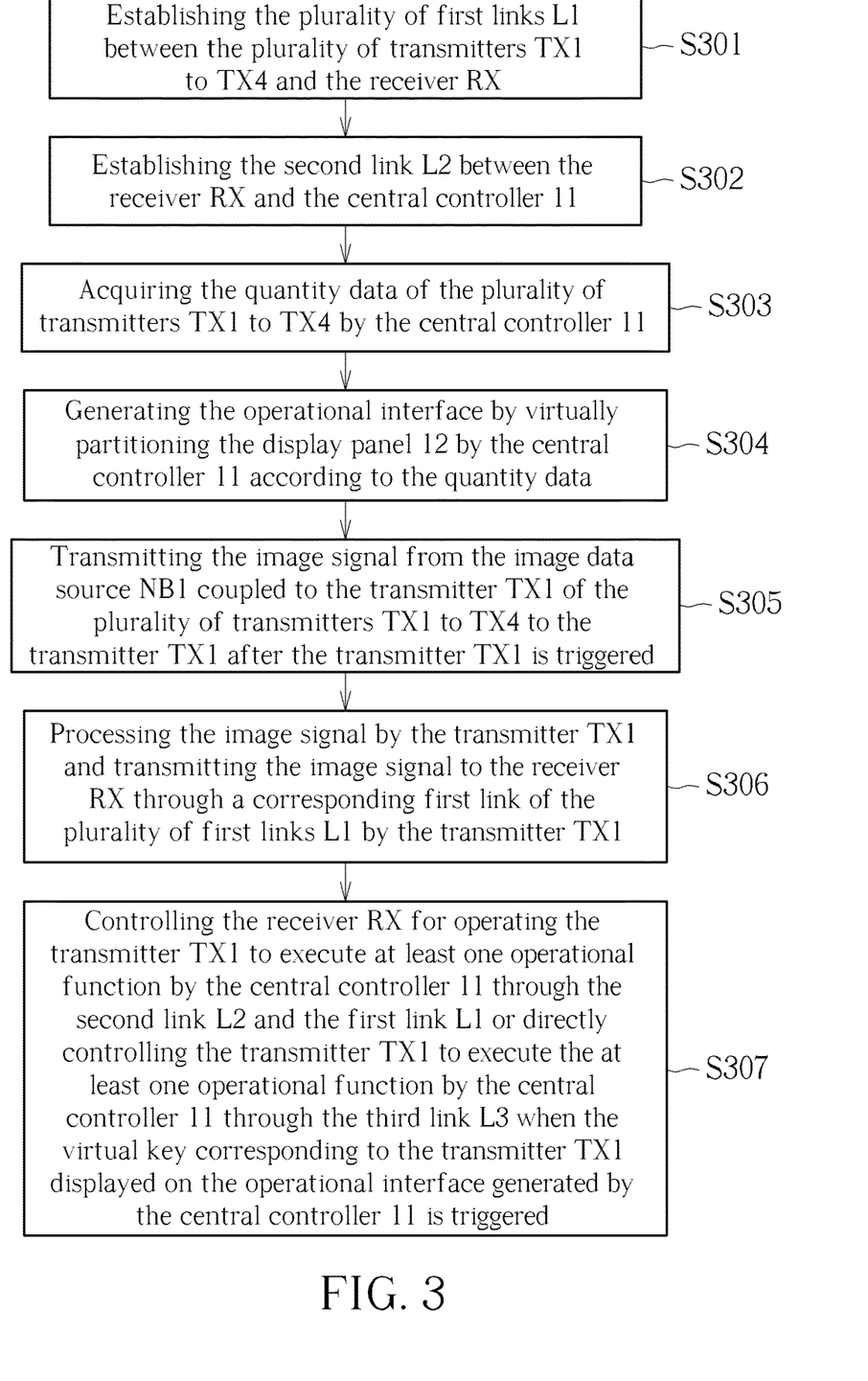
FIG. 3 is a flow chart of performing an operation method for virtually partitioning the display panel by the operation system in FIG. 1.

FIG. 3 is a flow chart of performing an operation method for virtually partitioning the display panel 12 by the operation system 100. The operation method for virtually partitioning the display panel includes step S301 to step S307. Ant reasonable technology modification falls into the scope of the present invention. Step S301 to step S307 are illustrated below.

step S301: establishing the plurality of first links L1 between the plurality of transmitters TX1 to TX4 and the receiver RX;

step S302: establishing the second link L2 between the receiver RX and the central controller 11;

step S303: acquiring the quantity data of the plurality of transmitters TX1 to TX4 by the central controller 11;

step S304: generating the operational interface by virtually partitioning the display panel 12 by the central controller 11 according to the quantity data;

step S305: transmitting the image signal from the image data source NB1 coupled to the transmitter TX1 of the plurality of transmitters TX1 to TX4 to the transmitter TX1 after the transmitter TX1 is triggered;

step S306: processing the image signal by the transmitter TX1 and transmitting the image signal to the receiver RX through a corresponding first link of the plurality of first links L1 by the transmitter TX1;

step S307: controlling the receiver RX for operating the transmitter TX1 to execute at least one operational function by the central controller 11 through the second link L2 and the first link L1 or directly controlling the transmitter TX1 to execute the at least one operational function by the central controller 11 through the third link L3 when the virtual key corresponding to the transmitter TX1 displayed on the operational interface generated by the central controller 11 is triggered.

Details of step S301 to step S307 are illustrated previously. Thus, they are omitted here. The central controller 11 of the operation system 100 can virtually partition the display panel 12 for displaying the operational interface according to the number of currently on-line transmitters or a pre-configured number. Therefore, the operational interface of the central controller 11 can be operated intuitively. When the operation system 100 is applied to a reporting process of a conference meeting having several members, the meeting efficiency can be increased.

To sum up, the present invention illustrates an operation method and an operation system for virtually partitioning a display panel into a plurality of blocks. The operation system can be used for a reporting process of a conference meeting since a central controller can generate an operational interface having the plurality of blocks according to on-line transmitters or a pre-configured number. Therefore, the operational interface of the central controller can be operated intuitively. In other words, when a moderator of the conference meeting operates the central controller, the moderator can instantly set operational details through the central controller according to any change of meeting data authority or any change of the number of meeting members. Therefore, the operation method and the operation system for virtually partitioning the display panel of the present invention can improve operating efficiency and operating convenience of the reporting process of the conference meeting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operation method for virtually partitioning a display panel comprising:
   establishing a plurality of first links between a plurality of transmitters and a receiver;
   establishing a second link between the receiver and a central controller;
   acquiring quantity data of the plurality of transmitters by the central controller;
   generating an operational interface by virtually partitioning the display panel by the central controller according to the quantity data;
   dynamically controlling number of virtually partitioned display panels according to number of transmitters;
   transmitting an image signal from an image data source coupled to a transmitter of the plurality of transmitters to the transmitter after the transmitter is triggered;
   processing the image signal by the transmitter and transmitting the image signal to the receiver through a corresponding first link of the plurality of first links by the transmitter; and
   controlling the receiver for operating the transmitter to execute at least one operational function by the central controller through the second link and the first link or directly controlling the transmitter to execute the at least one operational function by the central controller through a third link when a virtual key corresponding to the transmitter displayed on the operational interface generated by the central controller is triggered.

2. The method of claim 1, wherein controlling the receiver for operating the transmitter to execute the at least one operational function by the central controller through the second link and the first link comprises:
   generating a control signal by the central controller to the receiver through the second link; and
   controlling the transmitter by the receiver through the first link according to the control signal for blocking the transmitter.

3. The method of claim 1, wherein directly controlling the transmitter to execute the at least one operational function by the central controller through the third link comprises:
   generating a control signal by the central controller to the transmitter through the third link; and
   blocking the transmitter after the control signal is received by the receiver.

4. The method of claim 1, further comprising:
   generating a control signal by the central controller to the receiver through the second link; and
   blocking data transmitted from at least one transmitter of the plurality of transmitters by the receiver according to the control signal.

5. The method of claim 1, further comprising:
   transmitting a request signal from the receiver to the plurality of transmitters;
   transmitting identification data from the plurality of transmitters to the receiver through the plurality of first links after the request signal is received by the plurality of transmitters; and
   transmitting the identification data from the receiver to the central controller through the second link.

6. The method of claim 1, further comprising:
   automatically transmitting identification data from the plurality of transmitters to the receiver after the first links between the plurality of transmitters and the receiver are established; and
   transmitting the identification data from the receiver to the central controller through the second link.

7. The method of claim 1, further comprising:
   establishing a plurality of third links between the central controller and the plurality of transmitters;
   transmitting a request signal from the central controller to the plurality of transmitters; and
   transmitting identification data from the plurality of transmitters to the central controller through the plurality of third links after the request signal is received by the plurality of transmitters.

8. The method of claim 1, further comprising:
   establishing a plurality of third links between the central controller and the plurality of transmitters; and
   automatically transmitting identification data from the plurality of transmitters to the central controller after the plurality of third links between the central controller and the plurality of transmitters are established.

9. The method of claim 1, further comprising:
   transmitting a plurality of indication signals from the receiver or the central controller to the plurality of transmitters for controlling the plurality of transmitters to display different colors;
   wherein the operational interface generated by the central controller comprises a plurality of blocks virtually divided from the display panel, and the plurality of blocks correspond to colors displayed by different transmitters.

10. The method of claim 1, further comprising:
    acquiring text identification data of a plurality of image data sources and/or image identification data of a plurality of users by the plurality of transmitters after the plurality of transmitters are coupled to the plurality of image data sources;
    wherein the operational interface generated by the central controller comprises a plurality of blocks for virtually partitioning the display panel, and the plurality of blocks correspond to the text identification data of the plurality of image data sources and/or the image identification data of the plurality of users.

11. An operation system for virtually partitioning a display panel comprising:
    a plurality of transmitters configured to transmit data;
    a receiver linked to the plurality of transmitters;
    a display device coupled to the receiver and configured to display images; and
    a central controller linked to the receiver and configured to control the receiver;
    wherein the display panel is disposed on the central controller, a plurality of first links between the plurality of transmitters and the receiver are established, a second link between the receiver and the central controller is established, the central controller acquires quantity data of the plurality of transmitters, the central controller generates an operational interface by virtually partitioning the display panel according to the quantity data, the central controller dynamically controls number of virtually partitioned display panels according to number of transmitters, an image data source coupled to a transmitter of the plurality of transmitters transmits an image signal to the transmitter after the transmitter is triggered, the transmitter processes the image signal and transmits the image signal to the receiver through a corresponding first link of the plurality of first links, and the central controller controls the receiver for operating the transmitter to execute at least one operational function through the second link and the first link or directly controls the transmitter to execute the at least one operational function through a third link when a virtual key corresponding to the transmitter displayed on the operational interface generated by the central controller is triggered.

12. The system of claim 11, wherein the central controller generates a control signal to the receiver through the second link, and the receiver controls the transmitter through the first link according to the control signal for blocking the transmitter.

13. The system of claim 11, wherein the central controller generates a control signal to the transmitter through the third link.

14. The system of claim 11, wherein the central controller generates a control signal to the receiver through the second link, and the receiver blocks data transmitted from at least one transmitter of the plurality of transmitters according to the control signal.

15. The system of claim 11, wherein the receiver transmits a request signal to the plurality of transmitters, the plurality of transmitters transmit identification data to the receiver through the plurality of first links after the request signal is received by the plurality of transmitters, and the receiver transmits the identification data to the central controller through the second link.

16. The system of claim 11, wherein the plurality of transmitters automatically transmit identification data to the receiver after the first links between the plurality of transmitters and the receiver are established.

17. The system of claim 11, wherein a plurality of third links between the central controller and the plurality of transmitters are established, the central controller transmits a request signal to the plurality of transmitters, and the plurality of transmitters transmit identification data to the central controller through the plurality of third links after the request signal is received by the plurality of transmitters.

18. The system of claim 11, wherein a plurality of third links between the central controller and the plurality of transmitters are established, and the plurality of transmitters automatically transmit identification data to the central controller after the plurality of third links between the central controller and the plurality of transmitters are established.

19. The system of claim 11, wherein the receiver or the central controller transmits a plurality of indication signals to the plurality of transmitters for controlling the plurality of transmitters to display different colors.

20. The system of claim 11, wherein the plurality of transmitters acquire text identification data of a plurality of image data sources and/or image identification data of a plurality of users after the plurality of transmitters are coupled to the plurality of image data sources, the operational interface generated by the central controller comprises a plurality of blocks for virtually partitioning the display panel, and the plurality of blocks correspond to the text identification data of the plurality of image data sources and/or the image identification data of the plurality of users.

21. An operation system for virtually partitioning a display panel comprising:
a plurality of transmitters configured to transmit data;
a receiver linked to the plurality of transmitters;
a display device coupled to the receiver and configured to display images; and
a central controller linked to the receiver and configured to control the receiver;
wherein the display panel is disposed on the central controller, a plurality of first links between the plurality of transmitters and the receiver are established, a second link between the receiver and the central controller is established, the central controller acquires quantity data of the plurality of transmitters, the central controller generates an operational interface by virtually partitioning the display panel according to the quantity data, the receiver or the central controller transmits a plurality of indication signals to the plurality of transmitters for controlling the plurality of transmitters to display different identification codes, an image data source coupled to a transmitter of the plurality of transmitters transmits an image signal to the transmitter after the transmitter is triggered, the transmitter processes the image signal and transmits the image signal to the receiver through a corresponding first link of the plurality of first links, and the central controller controls the receiver for operating the transmitter to execute at least one operational function through the second link and the first link or directly controls the transmitter to execute the at least one operational function through a third link when a virtual key corresponding to the transmitter displayed on the operational interface generated by the central controller is triggered.

\* \* \* \* \*